(12) United States Patent
Yasuda et al.

(10) Patent No.: US 9,127,754 B2
(45) Date of Patent: Sep. 8, 2015

(54) CLUTCH MECHANISM AND IMAGE FORMING APPARATUS WITH SAME

(71) Applicants: Jun Yasuda, Chiba (JP); Kenji Tomita, Kanagawa (JP)

(72) Inventors: Jun Yasuda, Chiba (JP); Kenji Tomita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 108 days.

(21) Appl. No.: 13/729,273

(22) Filed: Dec. 28, 2012

(65) Prior Publication Data
US 2013/0237366 A1 Sep. 12, 2013

(30) Foreign Application Priority Data

Mar. 6, 2012 (JP) .................................. 2012-049171
Oct. 10, 2012 (JP) .................................. 2012-224951

(51) Int. Cl.
*F16H 3/44* (2006.01)
*G03G 15/01* (2006.01)
*G03G 15/16* (2006.01)
*G03G 15/00* (2006.01)

(52) U.S. Cl.
CPC .............. *F16H 3/44* (2013.01); *G03G 15/0189* (2013.01); *G03G 15/1615* (2013.01); *G03G 15/757* (2013.01); *F16H 2200/2005* (2013.01); *F16H 2200/2033* (2013.01); *G03G 2215/0132* (2013.01)

(58) Field of Classification Search
CPC ................ F16H 2200/2005; F16H 2200/2033; G03G 15/757
See application file for complete search history.

(56) References Cited

U.S. PATENT DOCUMENTS

| | | | |
|---|---|---|---|
| 6,170,353 B1 * | 1/2001 | Worner et al. ............. | 74/473.21 |
| 6,588,294 B1 * | 7/2003 | Rogg .......................... | 74/473.21 |
| 6,699,153 B2 * | 3/2004 | Biallas .......................... | 475/154 |
| 7,025,188 B2 * | 4/2006 | Lindenschmidt et al. . | 192/219.5 |

(Continued)

FOREIGN PATENT DOCUMENTS

EP 1679456 A1 * 7/2006
JP 2009-073648 4/2009

OTHER PUBLICATIONS

English translation of JP200973648A, http://translationportal.epo.org, Nov. 21, 2014.*

(Continued)

*Primary Examiner* — Roger Pang
(74) *Attorney, Agent, or Firm* — Oblon, McClelland, Maier & Neustadt, L.L.P.

(57) ABSTRACT

A clutch mechanism comprises a planetary gear unit including input transmission, output transmission, and transmission stopping members. Torque entering the input transmission member is outputted downstream of the planetary gear unit by the output transmission member when the transmission stopping member is fixed and is not outputted downstream when the transmission stopping member is unfixed and entering a rotatable state. A rotation prohibiting target has an engaging target and is integral with the transmission stopping member. A rotation prohibiting member has a supporting shaft, a swingable portion at its one end and an engaging portion at its other end to engage the engaging target to enable the transmission stopping member to exert the stopping function. The engaging portion disengages the engaging target to bring the transmission stopping member into an unfixed state. A damper unit absorbs vibration caused in the rotation prohibiting member during a switching operation.

20 Claims, 9 Drawing Sheets

(56) References Cited

U.S. PATENT DOCUMENTS

| | | | |
|---|---|---|---|
| 7,101,301 B2* | 9/2006 | Haka | 475/269 |
| 8,622,859 B2* | 1/2014 | Babbitt et al. | 475/1 |
| 2007/0135261 A1* | 6/2007 | Berger et al. | 477/96 |
| 2010/0021208 A1* | 1/2010 | Tomatsu | 399/222 |
| 2013/0101314 A1* | 4/2013 | Yasuda et al. | 399/167 |
| 2013/0223906 A1* | 8/2013 | Tomatsu | 399/361 |

OTHER PUBLICATIONS

U.S. Appl. No. 13/616,800, filed Sep. 14, 2012, Yasuda, et al.

* cited by examiner

CLUTCH MECHANISM AND IMAGE FORMING APPARATUS WITH SAME

CROSS-REFERENCE TO RELATED APPLICATIONS

This patent application is based on and claims priority pursuant to 35 U.S.C. §119 to Japanese Patent Application Nos. 2012-049171, filed on Mar. 6, 2012, and 2012-224951, filed on Oct. 10, 2012, in the Japanese Patent Office, the entire disclosures of which are hereby incorporated by reference herein.

BACKGROUND OF THE INVENTION

1. Field of the Invention

The present invention relates to a clutch mechanism used in an image forming apparatus, such as a printer, a facsimile, a copier, etc., and an image forming apparatus equipped with the same.

2. Description of the Related Art

In recent years, cost reduction, downsizing, and power saving are attempted in various systems, such as an image forming apparatus (e.g., a copier and a printer), etc. For example, a reduced number of driving sources (e.g., a motor or the like) is disposed in a narrow space with a planetary gear mechanism that decelerates an rpm (revolutions per minute) thereof as described in Japanese Patent Application Publication No. 2009-73648 (JP-2009-73648-A).

Specifically, to downsize the system a driving force transmission mechanism (e.g., a reverse driving unit) functioning as both a planetary gear deceleration mechanism and a planetary gear clutch mechanism (i.e., a planetary clutch mechanism) is employed to switch between forward and reverse rotations. The driving force transmission mechanism includes two planetary gear clutch mechanisms respectively placed upstream and downstream in a driving force transmission direction. Each planetary gear clutch mechanism includes an inner teeth gear at a driving force input site, a planetary gear that meshes with the inner teeth gear, a sun gear that meshes with the planetary gear, and a holder that holds the planetary gear.

Accordingly, torque transmitted to the inner teeth gear is outputted through the holder by bringing the sun gear into a rotation prohibited state. An external teeth gear is also coaxially integrally provided on an outer circumferential surface of the inner teeth gear while an external teeth gear is integrally provided on a periphery of the holder coaxially with the inner teeth gear in each planetary gear clutch mechanism. The external teeth gear integral with the inner teeth gear provided on the upstream side meshes with a driving gear (i.e., a driving force input gear). The external teeth gear integral with the inner teeth gear provided on the downstream side meshes with the external teeth gear on the upstream side via an idler gear. The respective external teeth gears integral with the holders of the upstream and downstream sides directly mesh with each other. The external teeth gear of the downstream side meshes with a driving force output gear that transmits the torque to a driving unit provided downstream.

A projection as a rotation prohibiting target (i.e., a rotation prohibited section) is integrally formed on the sun gear in each of the planetary gear clutch mechanisms not to rotate the sun gear when the rotation prohibiting target is prohibited from rotating. A projection (i.e., a rotation prohibiting device) serving as a rotation prohibiting member is also provided. When these projections engage each other, the sun gear is prohibited from rotating thereby entering a fixed state.

The projection of the rotation prohibiting member of each planetary gear clutch mechanism has an L-shape obtained by applying a bending process to a tip of a plate like member (hereinafter referred to as an L-shaped projection), and both sides of the projection engaging the rotation prohibiting target are parallel with each other. The side of the L-shaped projection becomes substantially parallel to a straight line extended through a rotational center of the rotation prohibiting target when it engages one side of the projection of the rotation prohibiting target.

One side of the projection of the rotation prohibiting target is formed almost parallel to each side of the L-shaped projection when engaging one side of the L-shaped projection. By contrast, the other side of the projection of the rotation prohibiting target has a slope inclining from the one side of the L-shaped projection when engaging the L-shaped projection during its rotation to smoothly guide the L-shaped projection. Since the side of the rotation prohibiting target and the side of the L-shaped projection are parallel to each other, these sides can engage on a plane, and accordingly an engagement state is rarely cancelled maintaining a fixed state of the sun gear even if any shock occurs during the engagement. However, since the rotation prohibiting target itself rotates, impact sound and/or free vibration of the rotation prohibiting member unavoidably occur when the rotation prohibiting member engages the L-shaped projection. Accordingly, there is a need for development of a clutch mechanism and an image forming apparatus with the clutch mechanism capable of reducing such noise while suppressing the free vibration and the impact.

SUMMARY OF THE INVENTION

Accordingly, the present invention provides a novel clutch mechanism comprises includes a planetary gear unit that includes a sun gear, a planetary gear meshing with the sun gear, an inner teeth gear meshing with the planetary gear, and a holder to hold the planetary gear. The sun gear, the planetary gear, and the inner teeth gear selectively rotates and stops to collectively provide driving force inputting, driving force outputting, and stopping functions as input transmission, output transmission, and transmission stopping members. Rotational driving force entering the input transmission member is outputted downstream of the planetary gear unit by the output transmission member when the transmission stopping member is in a fixed state, and is not outputted downstream when the transmission stopping member is unfixed entering a rotatable state. A rotation prohibiting target having an engaging target and integral with the transmission stopping member is provided. A rotation prohibiting member is swingable around a supporting shaft and has a swingable portion at its one end and an engaging portion at its other end to engage the engaging target to enable the transmission stopping member to exert the stopping function. The engaging portion disengages the engaging target to bring the transmission stopping member into a fixed-state cancelled state (hereinafter simply referred to as an unfixed state). A switching unit has an actuator to switch the rotation prohibiting member between engaging and disengaging states. A damper unit is provided to absorb vibration caused in the rotation prohibiting member during a switching operation.

In another aspect of the present invention, the rotation prohibiting member is freely swingable around its supporting shaft, and the damper unit is located between the supporting portion and an engaging shaft of the rotation prohibiting member engaging the engaging target.

In yet another aspect of the present invention, the damper unit includes a movable section to advance and retreat at least in a moving direction of the engaging target when the engaging section engages the engaging target, and a base to support and allow the movable section to advance and retreat, and an elastic member to elastically restrict advancing and retreating of the movable section.

In yet another aspect of the present invention, the rotation prohibiting member partially includes an elastically deformable portion as the damper unit.

In yet another aspect of the present invention, a supporting shaft made of resin is provided to support the rotation prohibiting member.

In yet another aspect of the present invention, the engaging section includes a forward rotation prohibiting side to engage the rotation prohibiting target when a forward rotation of the rotation prohibiting target is prohibited, and a backward rotation prohibiting side to engage the rotation prohibiting target when a backward rotation of the rotation prohibiting target is prohibited.

In yet another aspect of the present invention, an elastic bias member is provided to always approximate or separate the engaging section from the rotation prohibiting target in a prescribed direction, and a solenoid to move the engaging section in an opposite direction thereto.

In yet another aspect of the present invention, an image forming apparatus comprises an image bearer to bear an image, a developer bearer to bear developer, a driving source to drive the image bearer and the developer bearer, and a driving force transmission mechanism to propagate driving force from the driving source to the image bearer and the developer bearer. The driving force transmission mechanism includes the above-described clutch mechanism.

BRIEF DESCRIPTION OF THE SEVERAL VIEWS OF THE DRAWINGS

A more complete appreciation of the present invention and many of the attendant advantages thereof will be more readily obtained as substantially the same becomes better understood by reference to the following detailed description when considered in connection with the accompanying drawings, wherein:

FIGS. 2A and 2B are diagrams collectively illustrating a driving gear train of a photoconductor and a developing roller when an image formation unit for a black color rotates forward, in which FIG. 2A is a driving force transmission status of a planetary gear clutch mechanism, and FIG. 2B is a diagram showing a cutoff condition of the planetary gear clutch mechanism;

FIGS. 3A and 3B are diagrams collectively illustrating the driving gear train of a photoconductor and a developing roller, when an image formation unit for the black color rotates in reverse, in which FIG. 3A is a driving force transmission status of a planetary gear clutch mechanism, and FIG. 3B is a diagram showing a cutoff condition of the planetary gear clutch mechanism;

FIGS. 7A and 7B are diagrams illustrating an aspect when a ratchet and a pick of a prohibiting lever engage each other in both rotational directions, in which FIG. 7A is a diagram illustrating an engaging state of the pick during the forward rotation, and FIG. 7B is a diagram illustrating an engaging state of the pick during the reverse rotation;

FIGS. 9A and 9B are diagrams illustrating a rotational direction of the planetary gear clutch mechanism, in which FIG. 9A is a diagram illustrating a forward rotational direction, and FIG. 9B is a diagram illustrating a reverse rotational direction;

DETAILED DESCRIPTION OF THE INVENTION

Figure 2A:
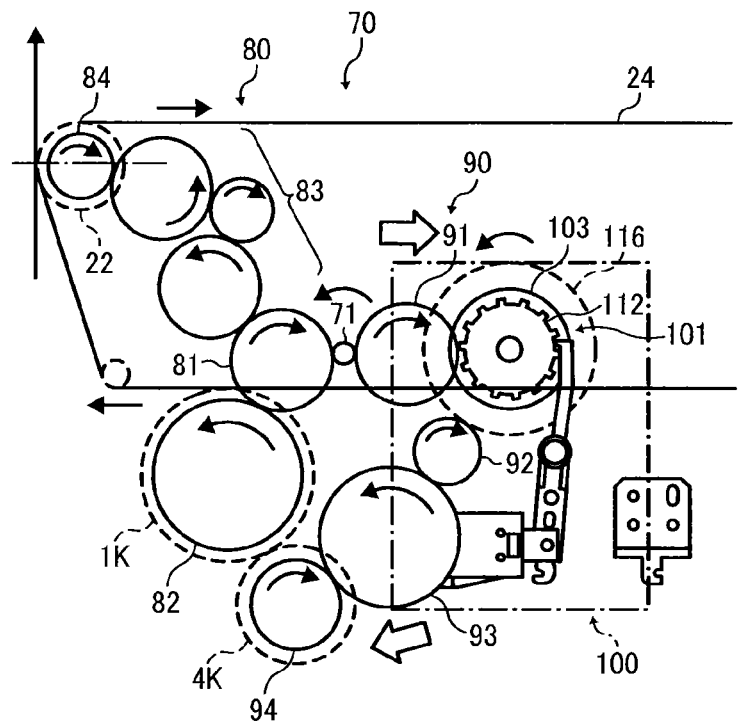
Figure 2B:
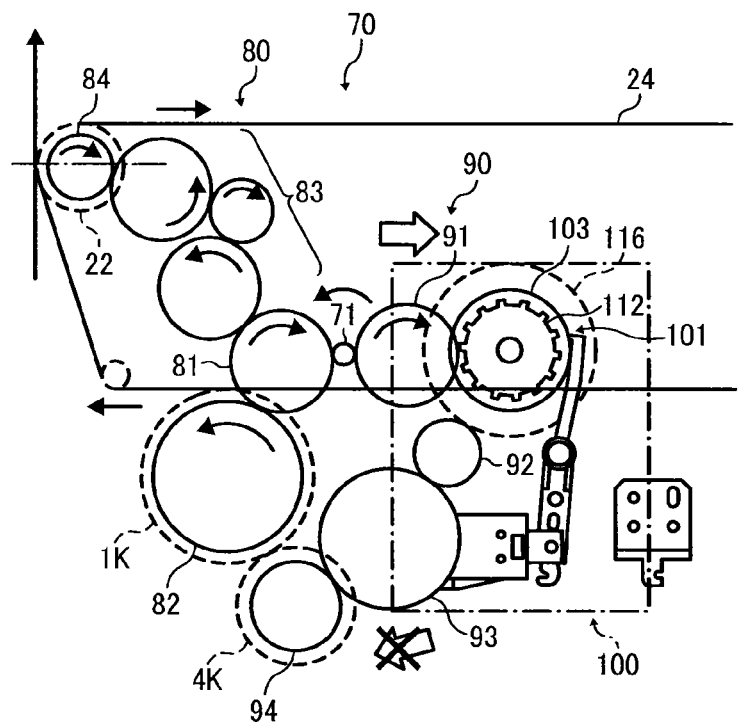
Figure 3A:
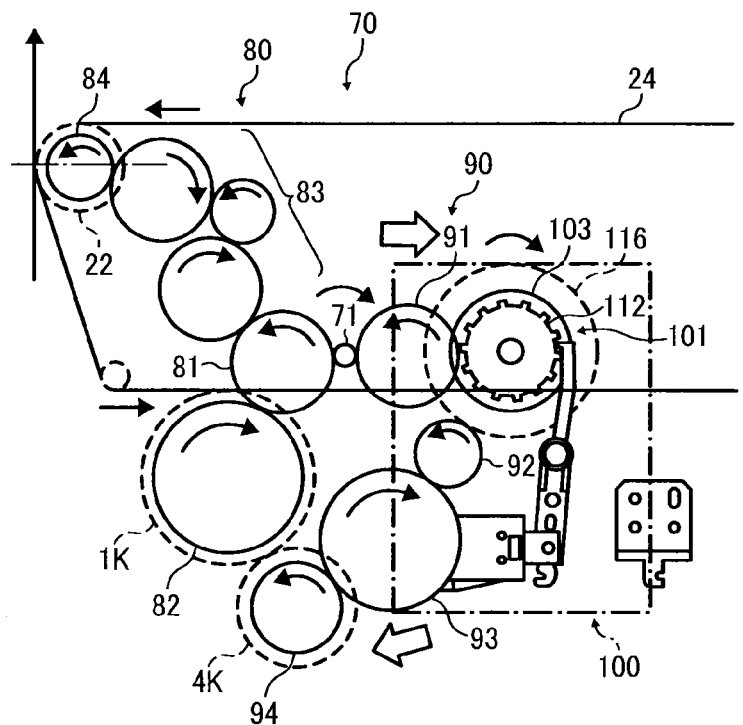
Figure 3B:
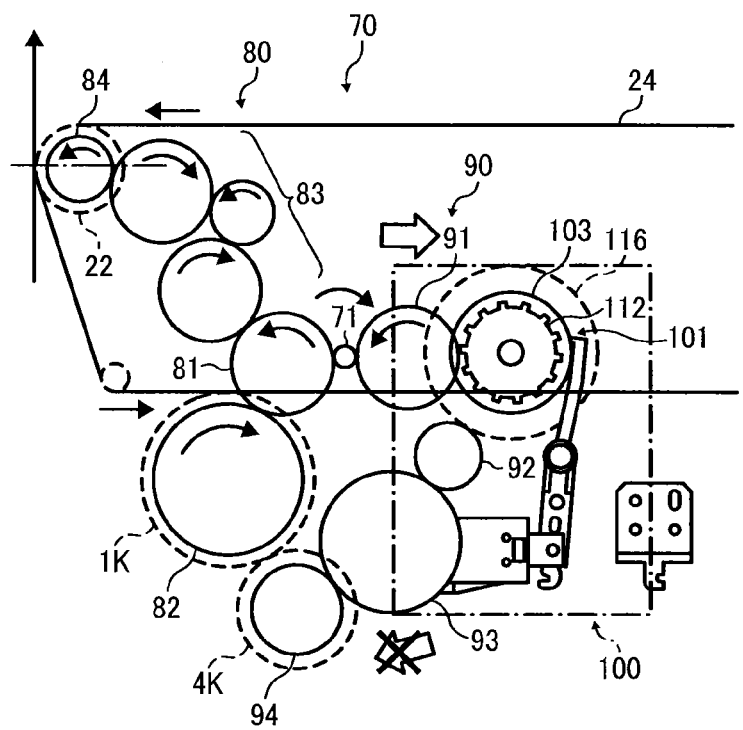

Referring now to the drawings, wherein like reference numerals designate identical or corresponding parts throughout the several views thereof and in particular to FIG. 1, as one embodiment of the present invention applied to an image forming apparatus, that applied to a tandem type color printer (hereinafter simply referred to as a printer 200) with an intermediate transfer system is explained. As shown there, a total overview of a printer 200 as an image forming apparatus according to the one embodiment is illustrated. FIGS. 2A and 2B are diagrams collectively illustrating a driving gear train 70 of a photoconductor 1K and a developing roller 4K when an image formation unit 10K for a black color rotates forward, wherein FIG. 2A is a driving force transmission status of a planetary gear clutch mechanism 100, and FIG. 2B is a diagram showing a cutoff condition of the planetary gear clutch mechanism 100. FIGS. 3A and 3B are also diagrams collectively illustrating a driving gear train 70K of the photoconductor 1K and the developing roller 4K, when the image formation unit 10K for a black color rotates in reverse, wherein FIG. 3A is a driving force transmission status of the planetary gear clutch mechanism 100, and FIG. 3B is a diagram showing a cutoff condition of the planetary gear clutch mechanism 100. FIGS. 2A to 3B illustrate sections of the planetary gear clutch mechanism 100 when viewed from a ratchet 112 integral with a sun gear 111 toward an inner teeth gear 101. Further, an output gear 116, a driving roller 22, a photoconductor 1K, and a developing roller 4K are placed on a front side of the planetary gear clutch mechanism 100 as illustrated by dashed lines.

Figure 4:
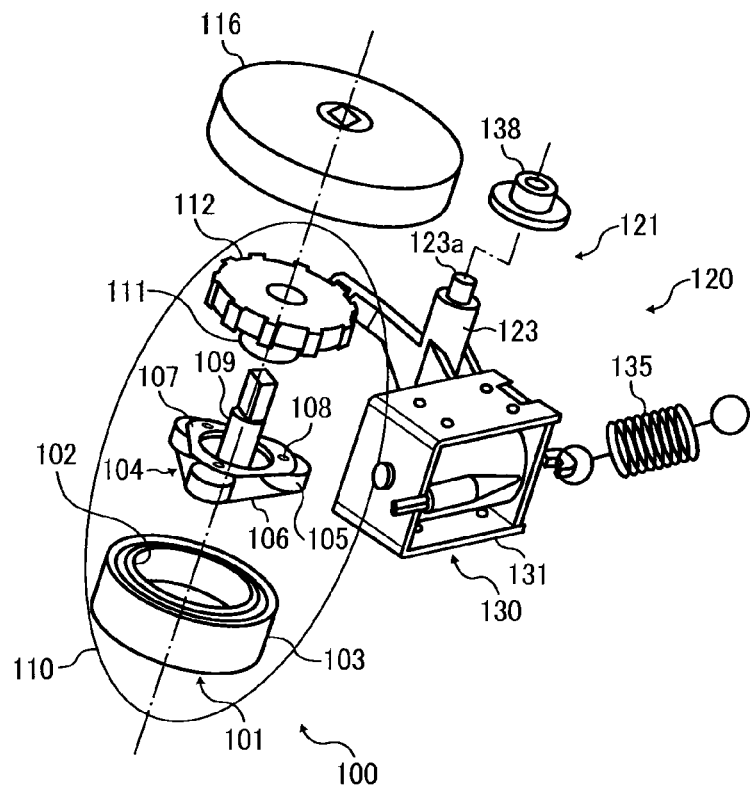
FIG. 4 is a perspective view illustrating the planetary gear clutch mechanism.
Figure 5:
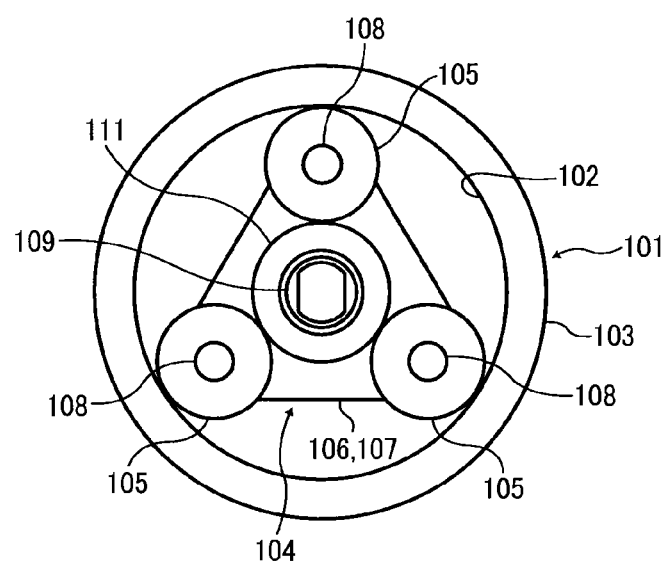
FIG. 5 is a diagram illustrating an operational principle of the planetary gear clutch mechanism.

FIG. 4 is a perspective view of the planetary gear clutch mechanism 100. FIG. 5 is a diagram illustrating an operational principle of the planetary gear clutch mechanism 100.

Figure 6A:
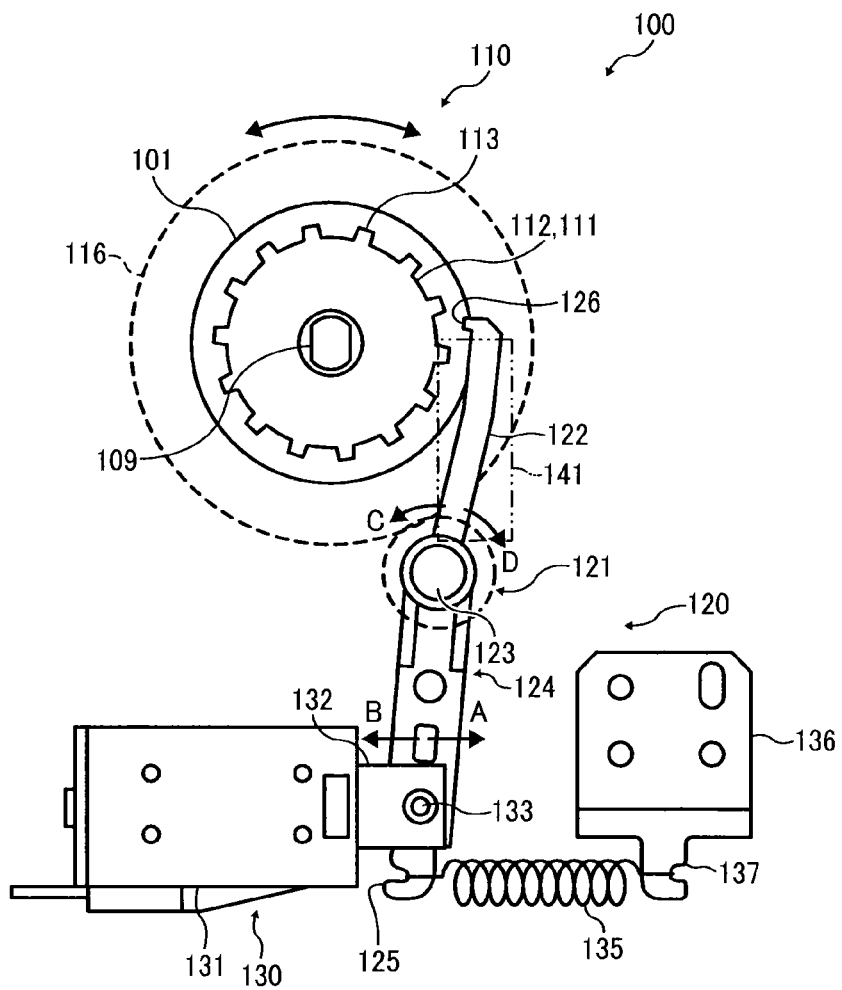
FIGS. 6A and 6B are diagrams collectively illustrating a manner of switching a sun gear included in the planetary gear clutch mechanism between a fixed state and an unfixed state.
Figure 6B:
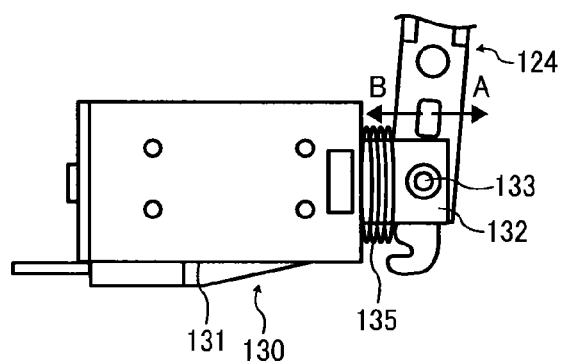
Figure 7A:
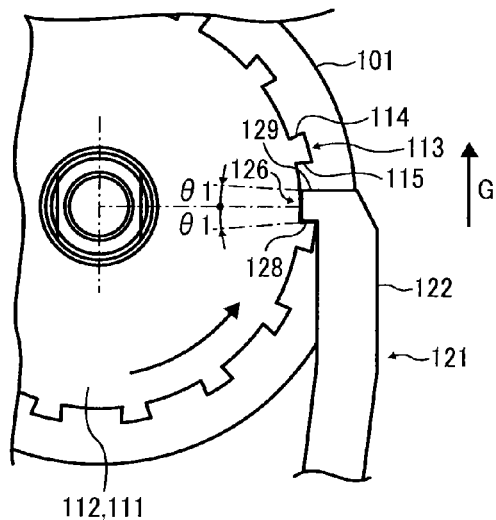
Figure 7B:
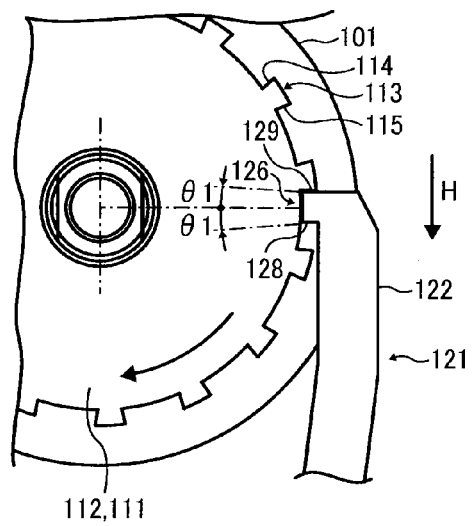
Figure 8:
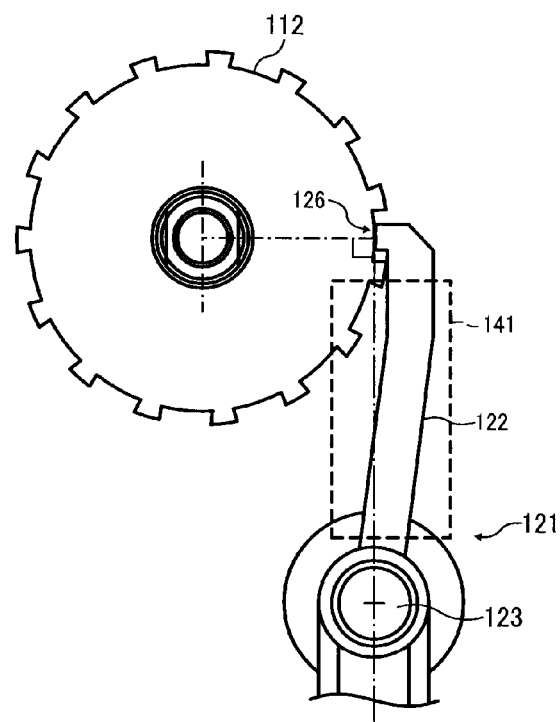
FIG. 8 is a diagram illustrating an aspect when the ratchet and the pick engage each other.
Figure 9A:
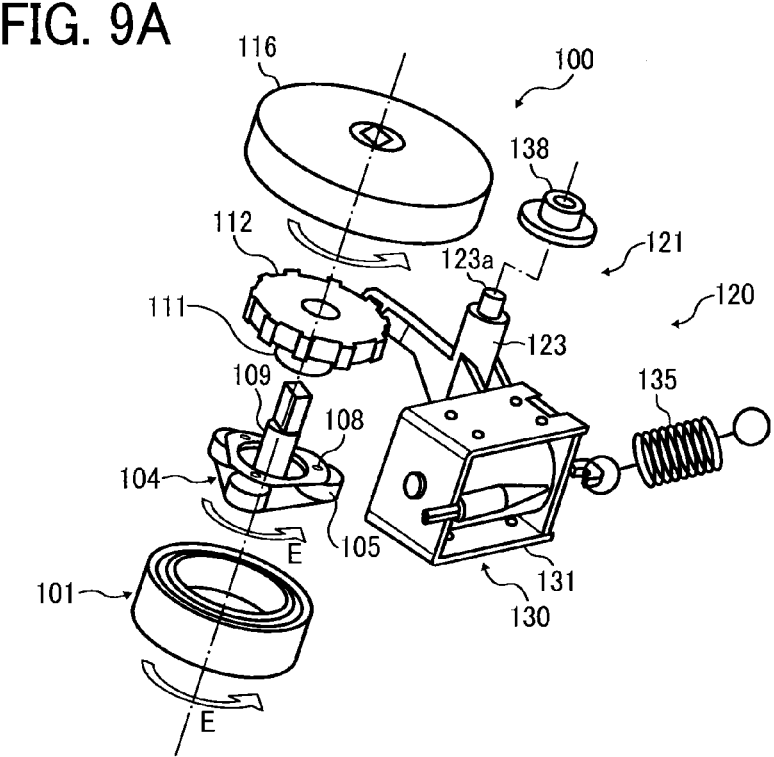
Figure 9B:
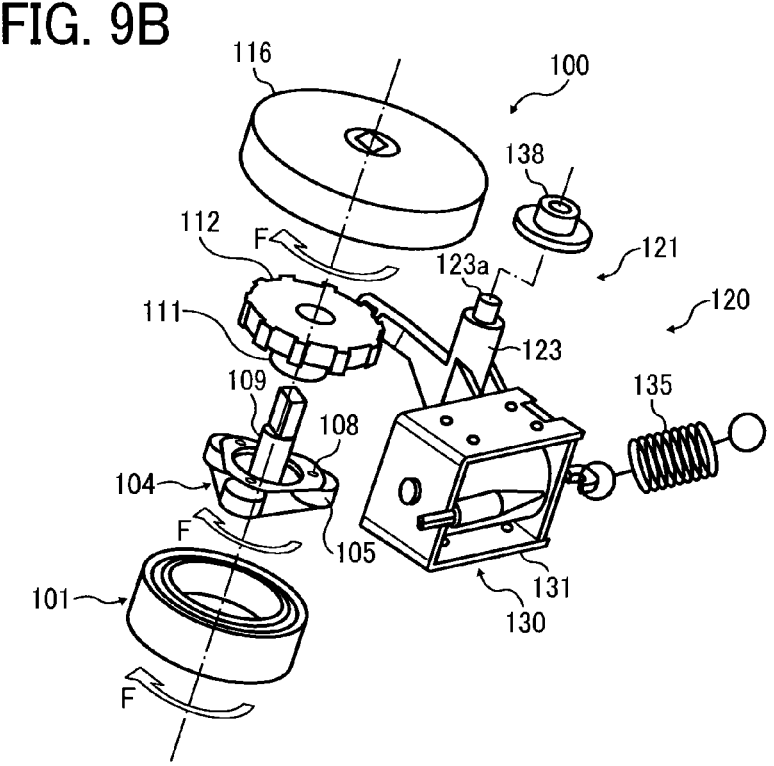
Figure 10:
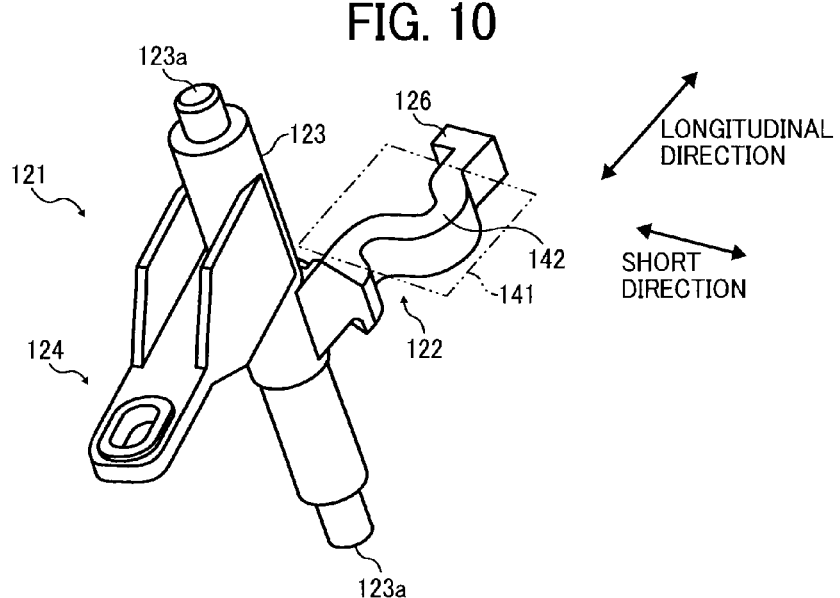
FIG. 10 is a diagram illustrating a rotation prohibiting member with a wavy curvature portion.
Figure 11A:
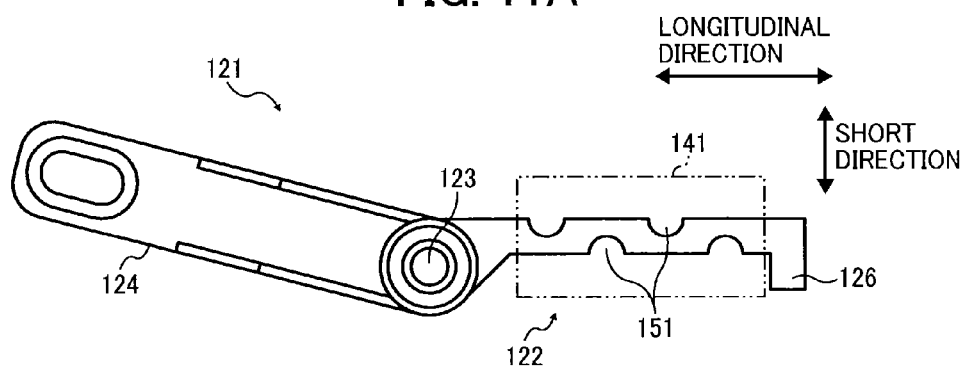
FIGS. 11A and 11B are diagrams collectively illustrating a rotation prohibiting member according to another embodiment of the present invention.
Figure 11B:
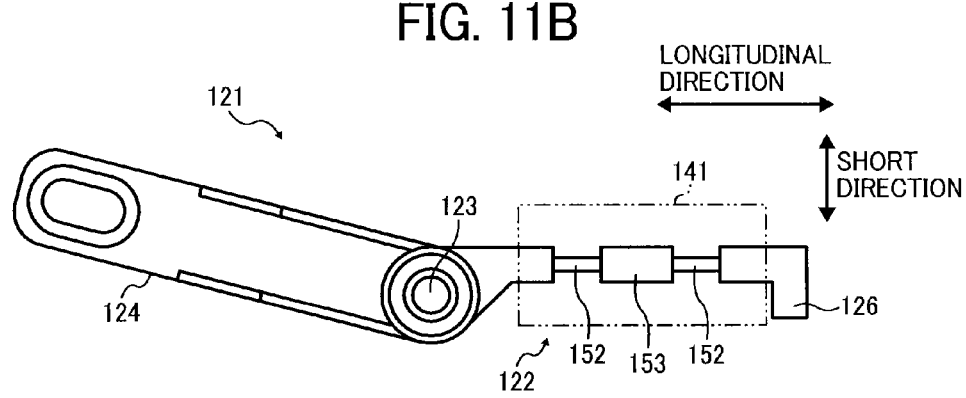
Figure 12:
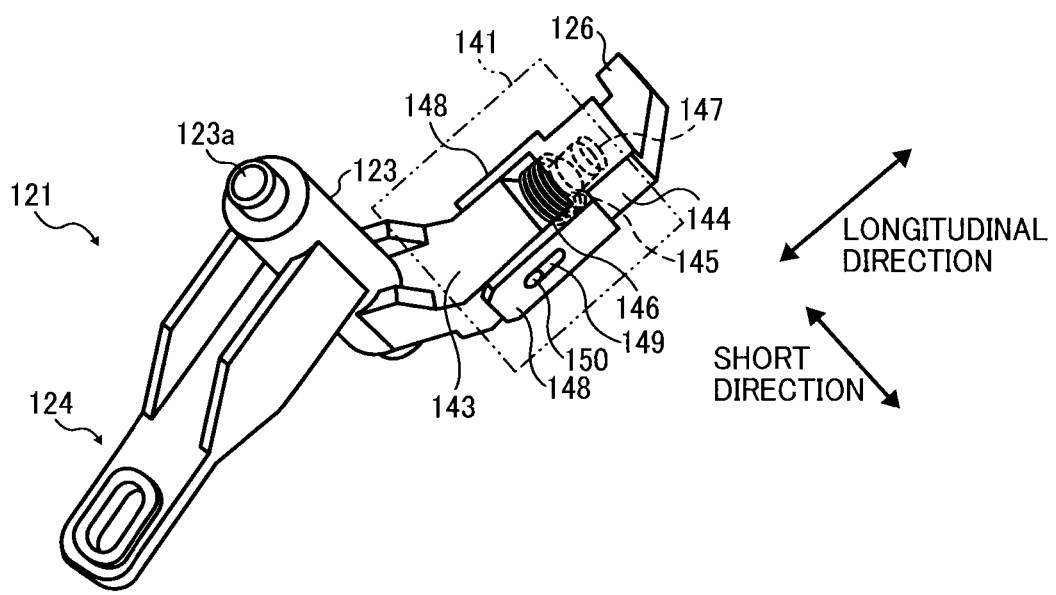
FIG. 12 is a diagram illustrating a rotation prohibiting member with an elastic member.

FIGS. 6A and 6B are diagrams collectively illustrating a manner of switching between fixed and unfixed states of a sun gear 111 included in the planetary gear clutch mechanism 100. FIGS. 7A and 7B are diagrams illustrating an aspect when a ratchet and a pick of a rotation prohibiting lever engage each other in both rotational directions. Specifically, FIG. 7A is a diagram illustrating an engaging state of the pick during the forward rotation, and FIG. 7B is a diagram illustrating an engaging state of the pick during the reverse rotation. FIG. 8 is a diagram illustrating an aspect when the ratchet and the pick engage each other. FIG. 9 is a diagram illustrating a rotational direction of the planetary gear clutch mechanism. Specifically, FIG. 9A illustrates a forward rotational direction, and FIG. 9B illustrates a reverse rotational direction. Here, a tooth profile of the gear is omitted only illustrating a reference pitch circle in each of the above-described drawings. Unless otherwise particularly described in the description herein below, a rotational direction of a rotation member, such as a gear, an intermediate transfer belt 24, etc., is forward when it rotates during image formation, and a reverse rotational direction when it rotates in reverse thereto. When an absolute rotational direction (i.e., not a relative rotational direction) needs to be described, a rotational direction is simply referred to as a clockwise or counterclockwise except for that in FIG. 3. FIG. 10 is a diagram illustrating a rotation prohibiting member with a wavy curvature portion. FIGS. 11A and 11B are diagrams collectively illustrating another rotation prohibiting member according to another embodiment of the present invention. FIG. 12 is a diagram illustrating a rotation prohibiting member with an elastic member.

Initially, a whole structure and operation of a printer 200 of this embodiment is described with reference to FIG. 1. As shown there, multiple image formation units 10K, 10M, 10C, and 10Y are provided in this printer 200 corresponding to four color toner particles of black (K), magenta (M), cyan (C), and yellow (Y). Each image formation unit 10 contacts a lower surface of an intermediate transfer belt 24. The intermediate transfer belt 24 is stretched by a driving roller 22 as an opposed roller opposed to a secondary transfer roller 25, a driven roller 23, and multiple stretching rollers. The image formation units 10Y, 10C, 10M and 10K are located in this order from an upstream side (a side of the driven roller 23) in an endlessly moving direction of the intermediate transfer belt 24. These image formation units 10Y, 10C, 10M and 10K include drum-shaped photoconductors 1K, 1M, 1C, and 1Y serving as image carriers corresponding to respective colors. Around each photoconductor 1, a charger 2, a developing device 3, and a photoconductor cleaner 7 or the like are provided. When image information is sent from a personal computer or the like, each photoconductor 1 is driven and rotated, while each charger 2 uniformly charges a surface of the photoconductor 1. An optical writing unit 30 is placed below each photoconductor 1 and irradiates laser light to the surface of each photoconductor 1 based on the image information sent from the personal computer or the like thereby forming an electrostatic latent image thereon. The developing unit 3 of each unit then attracts toner and visualizes the electrostatic image into a toner image.

Figure 1:
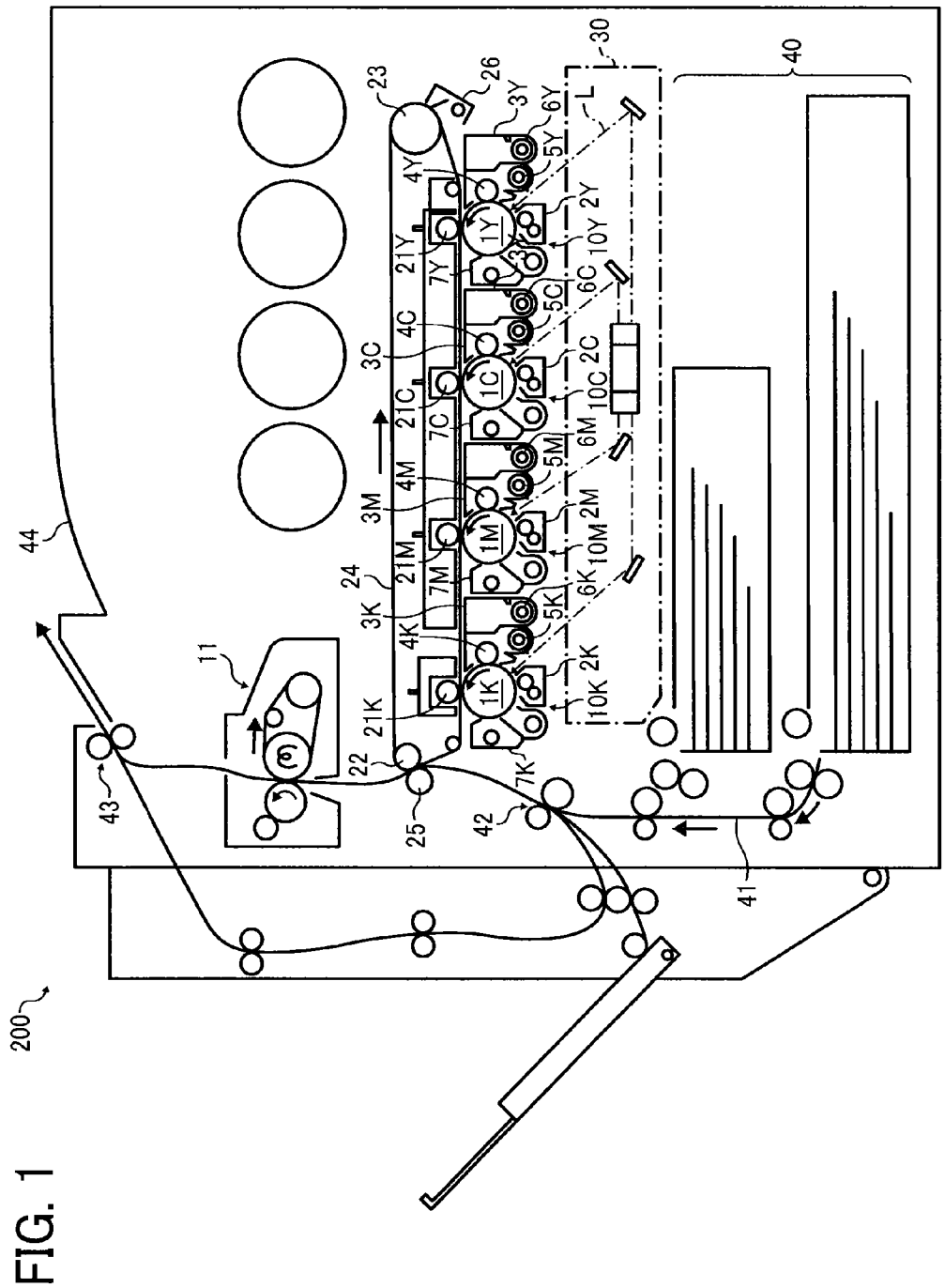
FIG. 1 is a schematic overview of a printer as an image formation apparatus according to one embodiment of the present invention.

Each color toner image borne on the photoconductor surface 1 is conveyed to a primary transfer roller 21 opposed to each photoconductor 1 via the intermediate transfer belt 24 that endlessly moves clockwise as each photoconductor 1 rotates counterclockwise as shown in FIG. 1. Subsequently, each color toner image is primarily transferred sequentially under a primary transfer bias applied to the primary transfer roller 21 from each surface of the photoconductor 1 onto the intermediate transfer belt 24 to be superimposed thereon. Thus, a color toner image is formed on the intermediate transfer belts 24. The color toner image primarily transferred onto the intermediate transfer belt 24 is then conveyed to a secondary transfer position in which a secondary transfer roller 25 is arranged opposite a driving roller 22 via the intermediate transfer belt 24 as the intermediate transfer belt 24 endlessly moves. Further, a transfer sheet P is fed from a sheet feeding device 40 disposed below an optical writing device 30 along a transportation route 41 as shown by a solid line in FIG. 1 synchronizing with the color toner image conveyed to the secondary transfer position. The color toner image is transferred at once onto the transfer sheet P conveyed to the secondary transfer position by a pair of registration rollers 42 under a secondary transfer bias applied to the secondary transfer roller 25. The transfer sheet P with the color toner image transferred at once thereonto is then conveyed to the fixing device 11 disposed downstream of the secondary transfer position in the transfer sheet transporting direction along the transportation route 41, so that the color toner image is fused onto the transfer sheet P there. After the fixing process, the transfer sheet P exits from a sheet ejection outlet 43 onto a sheet ejection tray and is stacked thereon. Further, transfer residual toner not completely transferred from each photoconductor 1 onto the intermediate transfer belt 24 at the first transfer position during the primary transfer process is removed by a photoconductor cleaner 7 disposed downstream of the primary transfer position of each photoconductor 1 in a photoconductor rotational direction. Further, transfer residual toner not completely transferred in the secondary transfer process from the intermediate transfer belt 24 onto the transfer sheet P at the secondary transfer position is also removed by a belt cleaner 26 to prepare for the next image formation.

Here, to rotate and drive the photoconductor 1 included in each image formation unit 10 and the developing roller 4 and a developer mixing and conveying screws 5 and 6 included in the developing device 3, respective driving motors can be provided as driving sources. However, according to this embodiment of the printer 200, in view of cost and energy saving, a single driving motor is used to propagate driving force to multiple image formation units 10. Specifically, the image formation units 10Y, 10C, and 10M operated in a color image formation mode share the single driving motor, while a most frequently used image formation unit 10K for black employs another single driving motor. In each image formation unit 10, driving force is transmitted to the photoconductor 1, the developing roller 4, and the developer mixing conveying screws 5 and 6 of the developing device 3 via driving gear trains. The driving gear train for the driving motor disposed in the image formation unit 10K for the black color can also propagate the driving force to the driving roller 22 that rotates the intermediate transfer belt 24. With this arrangement of such a rotation driving system, the printer 200 can reduce cost saving energy.

Further, in a system employing a photoconductor 1, a developing roller 4, developer mixing conveying screws 5 and 6 of a developing device, etc., like the rotary members of the image formation unit 10 of this embodiment, the developing roller 4 tends to deteriorate faster than the photoconductor 1 as time elapses. Thus, the developing roller 4 is desirably driven and rotated minimum times for necessity. Further, after image formation is completed in each image formation unit 10, multiple developer chunks sometimes remain sparsely on a portion of the developer mixing carrying screw 5 exposed from the upper surface of the developer when driven synchronizing with the developing roller 4. Such developer chunks are more readily condensed than those not exposed from the upper surface of the developer. Accordingly, when the image formation is repeated leaving the developer chunks as are, the developer chunks initially in a small developer mass state repeats condensation and growth. As a result, almost white stripes drawing white lines or the like appear in an image area, thereby degrading image quality. To reduce such generation of the white stripes, etc., it is efficient to drop the developer chunks on the portion exposed from the upper surface of the developer by slightly rotating the developer conveyance stirring screws 5 and 6 in an opposite direction to that rotating during the image formation mode in the developing device 3 after image formation. This is because the condensation and growth of the developer chunks can be suppressed.

Accordingly, in each image formation unit 10 of the printer 200 of this embodiment, a driving gear train for the photoconductor 1 and that for the developing roller 4 and the developer mixing conveying screws 5 and 6 provided in the developing device 3 are separated (bifurcated). Specifically, a planetary gear clutch mechanism 100 is provided in the driving gear train that transmits driving force to the developing roller 4 and the developer mixing conveying screws 5 and 6 of the developing device 3 as a clutch mechanism accommodating bi-directional rotary driving. With this configuration, rotary driving of the developing roller 4 can be restricted to the minimum, while achieving driving control enabling the bi-directional rotation for suppressing both adhesion of developer chunks to the developer mixing conveying screws 5 and 6 and condensation thereof in the developing device 3.

Now, a configuration of the driving gear train and the planetary gear clutch mechanism 100 provided in each image formation unit 10 of the printer 200 according to one embodiment of the present invention is described. Since the configuration of the planetary gear clutch mechanism 100 installed in each image formation unit 10 is substantially the same, the image formation unit 10K is described herein below as one example, and unless otherwise required, omitting applicable suffix codes K, M, C, and Y for respective colors from time to time. Further, in the below-described exemplary planetary gear clutch mechanism 100, input, output, and fixed functions (states) of the planetary gear mechanism 100 are assigned to rotations of three rotating elements, i.e., an inner teeth gear 101, a carrier 104 that holds a planetary gear 105, and a sun gear 111, respectively. Specifically, the inner teeth gear 101 serves as an input side transmission member to which the input function is assigned, the sun gear 111 serves as a fixed side transmission member to which the fixed function is assigned, and the carrier 104 holding planetary gear 105 serves as an output side member to which the output function is assigned.

However, the present invention is not only limited to the above-described assignment. Thus, for example, the input, output, and fixed functions can be assigned to respective rotations of the inner teeth gear 101, the sun gear 111, and the carrier 104 holding planetary gear 105 alternatively. Specifically, the inner teeth gear 101 can serve as the input side transmission member to which the input function is assigned, the carrier 104 holding planetary gear 105 can serve as the fixed side transmission member to which the fixed function is assigned, and the sun gear 111 can serve as the output side transmission member to which the out function is assigned. In other words, according to one embodiment of the present invention, the planetary gear clutch mechanism 100 can be operated by assigning the input, output, and fixed functions to rotations of these three rotating elements of the inner teeth gear 101, the carrier 104 holding planetary gear 105, and the sun gear 111, appropriately. By fixing (i.e., prohibiting rotation of) the fixed side transmission member to which the fixed function is assigned not to rotate, a driving force transmission condition capable of transmitting driving force is established. Whereas, by cancelling fixation of the fixed side transmission member, a driving force cut-off condition incapable of transmitting the driving force is established.

Now, initially, a driving gear train 70 provided in the image formation unit 10K is described with reference to FIGS. 2 and 3. The driving gear train 70 is divided into a photoconductor driving gear train 80 that drives and rotates a photoconductor 1 disposed on the left side of a driving gear 71 directly formed on (connected to) an output shaft of a driving motor (not shown) in the drawing and a developing roller driving gear train 90 that drives and rotates a developing roller 4 disposed on the right side (thereof) in the drawing. The photoconductor driving gear train 80 also includes an idler gear train 83 composed of more than one idler gear that transmits rotation driving force to a driving roller gear 84 connected to a driving roller 22 that drives and rotates an intermediate transfer belt 24. The developing roller driving gear train 90 has a planetary gear clutch mechanism 100. A screw gear (not shown) that drives and rotates developer mixing conveying screws 5 and 6 (not shown) is disposed downstream of a developing roller driving gear 94 that rotates and drives the developing roller 4 in a driving force transmitting direction. In each of the remaining image formation units 10Y, 10C, and 10M of the respective other colors, neither idler gear train 83 nor the driving roller gear 84 is provided in a photoconductor driving gear train 80 different from the image formation unit 10K. It is also different from the image formation unit 10K that the driving gear (71) that transmits the driving force to both the photoconductor driving gear train 80 and the developing roller driving gear train 90 thereof corresponds to a driving gear (not shown) for each of the image formation units 10Y, 10C, and 10M connected to a motor-driving gear train (not shown). However, except for these differences, the photoconductor driving gear train 80 that transmits driving force to the photoconductor 1 and the developing roller driving gear train 90 in each of the image formation units 10Y, 10C, and 10M have substantially the same configuration.

Further, the photoconductor driving gear train 80 of the image formation unit 10K includes a first photoconductor gear 81 meshing with the driving gear 71 from the left side, a photoconductor driving gear 82 meshing with the first photoconductor gear 81 from the lower left oblique side thereof, and an idler gear train 83 meshing with the first photoconductor gear 81 from the upper left oblique side thereof as shown in the drawing. Further, the developing roller driving gear train 90 includes a first developing roller gear 91 meshing with the driving gear 71 from the right side and the planetary gear clutch mechanism 100 having an input gear (112) meshing with the first developing roller gear 91 as shown in the drawing. The developing roller driving gear train 90 further includes a second developing roller gear 92 engaging an output gear 116 of the planetary gear clutch mechanism 100, a third developing roller gear 93 engaging the second developing roller gear 92, and a developing roller driving gear 94 engaging the third developing roller gear 93 to drive and rotate the developing roller 4. Here, an outer teeth gear 103 formed on an outer circumference of the inner teeth gear 101 serving as an input gear of the planetary gear clutch mechanism 100 and the output gear 116 of outer teeth are enabled to rotate in the same direction when driven in either direction during a driving force transmission condition.

As shown in FIG. 2A, to rotate both the photoconductor 1 and the developing roller 4 in a forward rotational direction as a direction rotated during image formation when the planetary gear clutch mechanism 100 is in a driving force transmission condition, the driving gear 71 rotates counter-clockwise. When the driving gear 71 rotates counter-clockwise, the driving roller gear 84 that drives and rotates the driving roller 22 rotates clockwise (i.e., in the forward rotational direction) through the first photoconductor gear 81 and the idler gear train 83 in the photoconductor driving gear train 80. The photoconductor driving gear 82 also rotates counterclockwise (i.e., in the forward rotational direction) via the first photoconductor gear 81. Whereas, in the developing roller driving gear train 90, the first developing roller gear 91 rotates clockwise, and the inner teeth gear 101 serving as the input gear of the planetary gear clutch mechanism 100 rotates counterclockwise. Further, the output gear 116 in the planetary gear clutch mechanism 100 rotates counterclockwise (i.e., in the forward rotational direction). Since such counterclockwise rotation of the output gear 116 is propagated through the second and the third developing roller gears 92 and 93, the developing roller driving gear 94 rotates clockwise (i.e., in the forward rotational direction). By contrast, as shown in FIG. 2B, when the planetary gear clutch mechanism 100 is in a cutoff condition, counterclockwise-torque is not transmitted from the inner teeth gear 101 to the output gear 116 in the planetary gear clutch mechanism 100. Accordingly, the output gear 116 rotates in neither direction. That is, when the planetary gear clutch mechanism 100 is in the cutoff condition and the driving motor is driven and rotated in the forward rotational direction, both the intermediate transfer belt 24 and the photosensitive member 1 are driven and rotated in the forward rotational direction. However, the developer mixing conveying screws 5 and 6 and the developing roller 4 in the developing device 3 rotate in neither direction.

Further, to reversely rotate both the photosensitive member 1 and the developing roller 4 in an opposite direction to that rotated during image formation when the planetary gear clutch mechanism 100 is in the driving force transmission state as shown in FIG. 3, the driving gear 71 rotates clockwise. When the driving gear 71 rotates clockwise, the driving roller gear 84 that drives the driving roller 22 through the first photoconductor gear 81 and the idler gear train 83 rotates counterclockwise in the photoconductor driving gear train 80. The photoconductor driving gear 82 also rotates clockwise as the reverse rotation through the first photoconductor gear 81. Whereas, in the developing roller driving gear train 90, the first developing roller gear 91 rotates counterclockwise and the inner teeth gear 101 as the input gear of the planetary gear clutch mechanism 100 rotates clockwise. Further, the output gear 116 of the planetary gear clutch mechanism 100 rotates clockwise as the reverse rotational direction. Such clockwise rotation of the output gear 116 is propagated through the second and third developing roller gears 92 and 93, so that the developing roller driving gear 94 rotates counterclockwise as the reverse rotational direction. By contrast, as shown in FIG. 3B, when the planetary gear clutch mechanism 100 is in a cutoff condition, the clockwise rotation driving force of the inner teeth gear 101 is not transmitted to the output gear 116 of the planetary gear clutch mechanism 100. Accordingly, the output gear 116 rotates in neither direction. That is, when the planetary gear clutch mechanism 100 is in the cutoff condition and the driving motor is driven and rotated in the reverse rotational direction, both the intermediate transfer belt 24 and the photosensitive member 1 are driven and rotated in the reverse rotational direction. However, the developer mixing conveying screws 5 and 6 and the developing roller 4 in the developing device 3 rotate in neither direction.

Now, a planetary gear clutch mechanism 100 capable of accommodating bi-directional rotation by its own as an exemplary feature of one embodiment of the present invention is described with reference to FIG. 4. Specifically, as there shown, a planetary gear clutch mechanism 100 used in a printer 200 of this embodiment includes the output gear 116 and a planetary gear unit 110 as a planetary gear mechanism having a ratchet serving as a rotation prohibiting target. Further, a rotation prohibiting unit 120 having a rotation prohibiting lever 121 serving as a rotation prohibiting member is also included in the planetary gear clutch mechanism 100. Yet further included in the planetary gear clutch mechanism 100 is a switching unit 130 having an actuator 131 that enables switching operation of the rotation prohibiting lever 121 between an engaging condition (i.e., an engaging condition or a hanging condition) and a disengaging condition (i.e., a disengagement condition or a non-hanging condition) and an elastic member 135 (e.g., an elastic bias member). The planetary gear unit 110 of the planetary gear clutch mechanism 100 includes an inner teeth gear 101 as the input gear rotated by external driving force, three planetary gears 105 engaging (i.e., meshing with) the inner teeth gear 101 at its an inner diameter side, and a carrier 104 (e.g., a planetary gear holder) that rotatably holds each planetary gear 105 at a prescribed pitch in a circumferential direction with each planetary gear 105 being capable of rotating on its own axis and revolving around an outer circumference of a sun gear 111. The planetary gear unit 110 also includes the sun gear 111 that engages each planetary gear 105. Also included in the planetary gear unit 110 is an output shaft 109 connecting the carrier 104 holing each planetary gear 105 and the output gear 116 that propagates rotation of the carrier 104 to the driving unit on the downstream side to enable these to work together in a unit. Further, the sun gear 111 is provided with a ratchet 112 serving as a rotation prohibiting target to work together. The inner teeth gear 101, the carrier 104, the sun gear 111, the ratchet 112, the output shaft 109, and the output gear 116 are coaxially disposed.

Now, an exemplary rotational motion of the planetary gear unit 110 is described.

When rotation drive force is continuously conveyed to the outer teeth gear 103 formed on a perimeter of the inner teeth gear 101 via the first developing roller gear 91 (not shown in FIG. 4), each planetary gear 105 that meshes with the inner teeth gear 102 of the inner teeth gear 101 rotates all the time. However, the carrier 104 holding each planetary gear 105 only rotates under a certain condition. Specifically, the planetary gear clutch mechanism 100 has a driving force propagating function to propagate rotation driving force to a driving unit disposed downstream of the planetary gear unit 110 under a certain condition via the planetary gear mechanism and a cutoff function to stop propagation of the rotation driving force thereto under the other condition via the planetary gear mechanism. Therefore, the output gear 116 also only rotates under the prescribed condition. Now, the driving-force propagating and cutoff functions achieved by the planetary gear mechanism of the planetary gear clutch mechanism 100 are described.

First, a driving force transmitting manner practiced by the planetary gear unit 110 is described. As shown in FIG. 5, a driving force transmission section of the planetary gear unit 110 mainly includes three types of gears, such as the inner teeth gear 102 of the inner teeth gear 101, and the planetary gear 105, and the sun gear 111. Specifically, the inner teeth gear 101 and the carrier 104 that holds planetary gears 105 enabling those to rotate on their own axes while revolving around the sun gear 111 are provided as rotatable elements coaxial with (a rotation axis of) a rotational axis of the inner teeth gear 101. A driving force transmitting function of the planetary gear unit 110 is achieved for the first time only when functions of rotatable input, rotatable output, and rotation prohibited fixed functions are assigned to these three rotatable elements, respectively. In the planetary gear unit 110 of this embodiment, the rotatable input, the rotatable output, and the rotation prohibited fixation are assigned to the inner teeth gear 101, the carrier 104, and the sun gear 111, respectively, to achieve the driving force transmitting function of the planetary gear mechanism. Thus, by switching the sun gear 111 with assignment of the rotation prohibited fixation to a fixed state, the planetary gear unit 110 is enabled to enter a driving force transmittable state capable of transmitting a rotation force to a driving unit located on the downstream side thereof. Whereas, by switching the sun gear 111 to a freely rotatable state (i.e., a unfixed state or an unfixed state), the planetary gear mechanism is caused to lose the drive transmitting function, i.e. the carrier 104 stops rotation, and enters the cutoff state, in which the driving force is not communicated to the driving unit on the downstream side thereof. Further, on an outer perimeter of the inner teeth gear 101, the outer teeth gear 103 is coaxially formed and meshes with the first developing roller gear 91, so that rotation driving force is transmitted to the inner teeth gear 101. Further, the carrier 104 includes a reference side plate 106 located far from the output gear 116, a pin 108 supported by the reference side plate 106 to freely swingably hold the planetary gear 105, and an end plate 107 supporting the other side end of the pin 108 (not shown in FIG. 5). The output shaft 109 is connected to the reference side plate 106 to transmit torque to output gear 116. Rotation prevention processing is applied to a section of the output shaft 109 that fits into the output gear 116 to be able to precisely propagate the torque to the output gear 116. A hole is formed on the end plate 107 to freely rotatably accept insertion of the sun gear 111. Holes are formed on the sun gear 111 and the ratchet 112 (not shown in FIG. 5) coaxial and integral with the sun gear 111 to freely rotatably allow penetration of the output shaft 109. Now, a specific configuration capable of switching the sun gear 111 between a fixed state in which rotation is prohibited and an unfixed state in which rotation is accepted is described.

As shown in FIG. 6A, the ratchet 112 coaxially united to the sun gear 111 as a rotation prohibiting target is provided with multiple teeth 113 (i.e., engaged sections) over its circumference at the same interval as teeth which engage a bi-directional rotation prohibiting pick 126 provided in a rotation prohibiting lever 121. Further, a rotation prohibiting unit 120 prohibiting rotation of the ratchet 112, i.e., the Sun gear 111 is provided with the rotation prohibiting lever 121 having a bi-directional rotation prohibiting pick 126 engaging the multiple teeth 113 and a supporting shaft 123 freely rotatably supporting the rotation prohibiting lever 121. Specifically, the rotation prohibiting lever 121 has a lever output section 122 on a side (i.e., a leading end) of the bidirectional rotation prohibiting pick 126 of the supporting shaft 123, and a lever input section 124 on the other side of the supporting shaft 123 (i.e., opposite the pick). Further, in a switching unit 130 that switches the pick of the lever output section 122 between a fixed state where it engages the rotation teeth 113 of the ratchet 112 and a unfixed state where it disengages and separates therefrom, an actuator 131 and an elastic member 135 are provided. The rotation prohibiting lever 121 (i.e., a rotation prohibiting member) is supported by the supporting shaft 123 with its one end being capable of rocking. At same time, the rotation prohibiting lever 121 is supported by the supporting shaft 123 with the bidirectional rotation prohibiting pick 126 (i.e., the other end portion) engaging (or hooking) the ratchet tooth 113 of the rotation prohibiting target (i.e., the ratchet 112) to fix a fixed-side transmission member (i.e., the sun gear 111) in an engaging condition and disengaging the ratchet tooth 113 to bring the fixed-side transmission member (i.e., the sun gear 111) in a fixed-state canceled state by its rocking motion.

Specifically, the rotation prohibiting lever 121 swings around a supporting shaft 123 provided thereon as a swinging center to either approach or separate from the ratchet 112. The bidirectional rotation prohibiting pick 126 provided at the other end portion of the rotation prohibiting lever 121 can engage the ratchet tooth 113, so that the bidirectional rotation prohibiting pick 126 can hook and immobilize the ratchet tooth 113 and unhook and mobilize thereof.

A cylinder state plunger 132 is provided in the actuator 131 and is almost horizontally movable as shown in FIGS. 6A and 6B when power is tuned on /off. An engagement pin 133 is provided at a tip of the plunger 132 to enter an oblong hole (not shown) provided on the lever input section 124 of the rotation prohibiting lever 121. Hence, with such almost horizontal movement, the rotation prohibiting lever 121 is swung around the supporting shaft 123 of the swinging center. Further, a notch 125 is formed at another tip of the rotation prohibiting lever 121 away from the supporting shaft 123 of the lever input section 124 to directly support the elastic member 135. The other end of the elastic member 135 thus supported by the notch 125 at its one end is also supported by a cutout 137 formed on an elastic holder 136. Thus, the notch 125 of the lever input section 124 is drawn by the elastic member 135 to the right (i.e., a direction shown by arrow A) in FIG. 6. Specifically, the bidirectional rotation prohibiting pick 126 is always biased by the elastic member 135 in a direction to approach the ratchet tooth 113 of the ratchet 112 in this embodiment.

With the switching unit 130 configured in this way, the plunger 132 moves to the right in FIGS. 6A and 6B due to a function of the elastic member 135 when power to the actuator 131 is turned off. Due to this movement, the rotation prohibiting lever 121 swings around the supporting shaft 123 counterclockwise in the drawing (i.e., a direction shown by arrow C). Simultaneously, any one of sides of the pick provided at the tip of the lever output section 122 contacts any one of sides of a tooth 113 of the ratchet 112, thereby entering a fixed state. Whereas, when the power supply to the actuator 131 is turned on, the plunger 132 moves to the left in FIG. 6 (i.e., a direction shown by arrow B). Due to this movement, the rotation prohibiting lever 121 swings around the supporting shaft 123 clockwise in the drawing (i.e., a direction shown by arrow D), and simultaneously, the pick provided at the tip of the lever output section 122 separates from the tooth 113 of the ratchet 112, thereby entering a unfixed state.

Here, when the developing roller 4 is rotated clockwise in a forward rotational direction as shown in FIG. 2A, the sun gear 111, accordingly the ratchet 112, is prohibited to rotate counterclockwise and enters a fixed state as shown in FIG. 7A. This prohibition is made by engaging an upstream side 114 of the ratchet tooth 113 of the ratchet 112 in a clockwise rotational direction and a forward rotation prohibiting side 128 of the bidirectional rotation prohibiting pick 126 located at the tip of the lever output section 122 of the rotation prohibiting lever 121 each other. Whereas, when the developing roller 4 is rotated counterclockwise as a reverse rotational direction as shown in FIG. 3A, the sun gear 111, accordingly the ratchet 112, is prohibited to rotate clockwise and enters a fixed state as shown in FIG. 7B. This prohibition is made by engaging a downstream side 115 of the ratchet tooth 113 of the ratchet 112 in the clockwise rotational direction and a backward rotation prohibiting side 129 of the bidirectional rotation prohibiting pick 126 located at the tip of the lever output section 122 each other. Here, to enable the developing roller driving gear train 90 located downstream of the planetary gear clutch mechanism 100 as the downstream side driving unit to accommodate bi-directional rotation, a shape of a side of the ratchet tooth 113 of the ratchet 112 and corresponding side of each rotation prohibiting pick formed on the lever output section 122 of the rotation prohibiting lever 121 need to be appropriately optimized. Because, to completely stop (movement of) the ratchet 112 integral with the sun gear 111 by engaging a side of the pick of the rotation prohibiting lever 121 and a side of the ratchet tooth 113 in a point-contact, extraordinary great amount of force (e.g., friction force) needs to be continuously applied.

In this embodiment, the elastic member causes an applicable side of the pick of the rotation prohibiting lever 121 to engage a side of the ratchet tooth 113 of the ratchet 112, thereby prohibiting (i.e., stopping) rotation of the ratchet 112. However, to save cost, a low-output actuator 131 is generally utilized. Further, the elastic member 135 generally needs to be stretched by drawing force of a low-output actuator 131 to operate the rotation prohibiting lever 121. Thus, since when elastic modulus of the elastic member 135 is relatively large, the low power actuator 131 cannot execute drawing, the elastic modulus of the elastic member 135 needs to be smaller. Because of this, it is generally difficult for the elastic member 135 to continuously provide certain power to stop a disc object at a point contact. For this reason, to stop rotation of the ratchet 112, a ratchet tooth 113 and a corresponding pick of the rotation prohibiting lever 121 need to be engaged each other in respective corresponding sides as a surface contact.

Specifically, each side is shaped as described below. Initially, the rotation prohibiting lever 121 is positioned to meet the below described condition. That is, when a linear line is horizontally drawn from a rotational center of the ratchet 112 in the fixed condition as shown in FIG. 8, and a tangent line is drawn from a rotational center of the rotation prohibiting lever 121 to a center on a gear root of the ratchet 112 between neighboring ratchet teeth in which sides of the pick of the rotation prohibiting lever 121 engage respective sides of the neighboring ratchet teeth, the tangential line intersects the horizontal liner line with angle of 90 degrees as shown in FIGS. 7A and 7B. Then, a forward rotation prohibiting side 128 and a backward prohibiting side 129 of the bidirectional rotation prohibiting pick 126 of the rotation prohibiting lever 121 are shaped so that when the horizontal line provides 0 degrees, a degree of angle made by each side (128 and 129) and the horizontal line is θ1. Whereas in the ratchet 112, the upstream and downstream sides 114 and 115 of the ratchet tooth 113 are shaped such that when the ratchet tooth 113 contacts the bidirectional rotation prohibiting pick 126 and a horizontal line provides 0 degrees, a degree of angle made by each side and the horizontal line is θ1. Hence, by shaping these sides of the ratchet 112 and the rotation prohibiting lever 121 like this, engagement of these sides can be not only a point contact but also a surface contact during the bi-directional rotation as shown in FIGS. 7A and 7B. Further, by providing the same angle θ1 to the respective engaging sides, the rotation prohibiting lever 121 can smoothly contact the ratchet 112 in the surface contact state toward the center 112 of the ratchet immediately after biting into the ratchet 112. Therefore, the planetary gear clutch mechanism 100 can accommodate bi-directional rotation of the driving unit provided on the downstream side.

Further, as shown in FIGS. 7A and 7B, only one pick engaging the teeth of the ratchet 112 is provided in the rotation prohibiting lever 121 and differentiates its engaging side (i.e., a contact section) in accordance a rotational direction of the ratchet 112. Specifically, by differentiating the engaging side in this way, durability and abrasion resistance against collision with the ratchet 112 are more effectively improved than a conventional system not differentiating the engaging side. That is, since a contact point of the rotation prohibiting lever 121 engaging the ratchet 112 is switched between the forward rotation prohibiting side and the reverse rotation prohibiting side of the bidirectional rotation prohibiting pick 126 depending on the rotational direction of the ratchet 112, the planetary gear clutch mechanism 100 can enjoy a long life. By thus enabling the planetary gear clutch mechanism 100 to accommodate bi-directional rotation of the driving unit disposed on the downstream side thereof, the output gear 116 and the planetary gear 110 of the planetary gear clutch mechanism 100 are rotated during the forward rotation of FIG. 3A as described below. Specifically, as shown in FIG. 9 A, the inner teeth gear 101 rotates in a direction from the left rear side to a front side (i.e., a direction shown by arrow E) in the drawing while the carrier 104 rotates in the same direction as the planetary gear 105 moves in orbit. The output gear 116 connected to the carrier 104 by the output shaft 109 also rotates in the same direction.

Whereas, the output gear 116 and the planetary gear unit 110 in the planetary gear clutch mechanism 100 are rotated during the reverse rotation mode of FIG. 4A as described below. Specifically, as shown in FIG. 9B, the inner teeth gear 101 rotates in a direction from the right rear side to a front side (i.e., a direction shown by arrow F) in the drawing while the carrier 104 rotates in the same direction as the planetary gear 105 moves in orbit. The output gear 116 connected to the carrier 104 by the output shaft 109 also rotates in the same direction as a result.

Further, a solenoid is used as the actuator 131, and a spring is used as the elastic member 135 in this embodiment. The spring as the elastic member 135 directly hangs on the cutout 125 formed on the lever input section 124 of the rotation prohibiting lever 121 as described above. Otherwise, the spring can be arranged surrounding the plunger 132 of the solenoid as the actuator 131 as shown in FIG. 6B. In accordance with an actual operation time needed for fixed and unfixed states of the sun gear 111, the solenoid is used as the actuator 131 and is energized for a shorter actual operation time while the spring is utilized as the elastic member 135 for a longer actual operating time. With this configuration, a usage time of the solenoid as the actuator 131 can be shortened so that the planetary gear clutch mechanism 100 can save energy to be consumed by itself. Further, with such a degree of freedom in arranging the spring as the elastic member 135, the planetary gear clutch mechanism 100 can enhance versatility. Hence, the planetary gear clutch mechanism 100 capable of accommodating bi-directional rotary driving is provided in the developing roller driving gear train 90 in the printer 200 of this embodiment. Accordingly, bi-directional rotation and stopping of the developing roller 4 and the developer mixing conveying screws 5 and 6 provided in the developing device 3 can be optionally executed. Since the actuator 131 operates for one of the shorter state between the fixed and unfixed states of the sun gear 111 as switching operation, less power is consumed saving energy.

Further, as described above, both sides of the ratchet tooth 113 of the ratchet 112 can contact either side of the pick of the rotation prohibiting lever 121 in a surface contact state when engaging the pick of the rotation prohibiting lever 121 in rotating in either direction. Since the surface contact is established, the end of the side of the L-shaped pick of the rotation prohibiting member does not contact a sloping side of the tooth of the rotation prohibiting section in the point contact state even when the ratchet teeth rotates in reverse as different from the system as described in JP-2009-73648-A, the fixed state is not easily cancelled by impact caused by the engagement therebetween. Accordingly, regardless of a direction of rotation driving force inputted to the inner teeth gear 101, the fixed state and the unfixed state can be safely switched therebetween to rotate the driving unit installed downstream of the planetary gear clutch mechanism 100 in both rotational directions. Therefore, the bi-directional rotation of the driving unit installed downstream of the planetary gear clutch mechanism 100 can be accommodated.

Further, each side of the tooth of the ratchet 112 and that of the rotation prohibiting lever 121 can be shaped when engaged by each other such that each engaging side of the pick of the rotation prohibiting lever 121 can incline regarding a linear line extended through a tip of a side of the ratchet 112 and the rotational center of the ratchet 112 to slide toward a bottom of the ratchet tooth of the ratchet 112. Thus, regardless of a rotational direction of the rotation driving force entered into the ratchet teeth gear 101, prohibition of rotation of the ratchet 112 can be ensured bringing the sun gear 111 into the fixed-state.

Further, a pair of the actuator 131 and the elastic member 135 provides switching operation of the rotation prohibiting lever 121 between the engaging and the disengaging states. With such operation, regardless of a rotational direction of the rotation driving force entered into the inner teeth gear 101, the ratchet 112 can be precisely switched to a disengaging state too, in other words, the sun gear is switched to the unfixed state. Accordingly, the bi-directional rotation of the driving unit installed downstream of the planetary gear clutch mechanism 100 can be accommodated. Hence, since the bi-directional rotation can be accommodated, the planetary gear clutch mechanism 100 is widely used and built in to reduce power consumption unlike the planetary gear clutch mechanism described in JP-2009-73648-A.

Further, since an actual operating time (needed) in the fixed and unfixed states of the sun gear 111 is considered when the rotation prohibiting lever 121 is switched by the actuator 131 between engaging and disengaging states, the actuator 131 can be selectively energized (by electric power) when the sun gear 111 is switched taking a shorter practical operation time and elastic force of the elastic member 135 is used when switched taking the longer operation time. By switching in this way, electric power just needed for moving the planetary gear clutch mechanism 100 can be reduced. Thus, a clutch mechanism with a planetary gear mechanism capable of accommodating bi-directional rotation of the driving unit installed on the downstream side can be provided efficiently saving energy.

Here, the rotation prohibiting lever 121 and the ratchet 112 similarly serve as rotating members. Thus, when the teeth of the ratchet 112 and the rotation prohibiting lever 121 engage each other as engaging (i.e., fixed) moment, in other words, the forward rotation prohibiting side 128 and the upstream side 114, or the bidirectional rotation prohibiting side 129 and the downstream side 115 engage each other in a surface contact therebetween, impact sound always occurs. In such a situation, if vibration energy generated and transmitted from the bidirectional rotation prohibiting pick 126 to the supporting shaft 123 is dispersed and is thus reduced, the noise can be reduced for the first time. To prevent the vibration around the shaft 123 by dispersing the vibration energy, the supporting shaft 123 of the rotation prohibiting lever 121 and a bearing 138 (see FIG. 4) supporting the supporting shaft 123 are made of resin in this embodiment. Further, as shown in FIGS. 6A and 6B, on the side of the bidirectional rotation prohibiting pick 126 of the supporting shaft 123 of the rotation prohibiting lever 121, i.e., between the supporting shaft 123 of the rotation prohibiting lever 121 and the bidirectional rotation prohibiting pick 126, a flexible portion (a vibration absorbing section) 141 is provided. Hence, when the fixed state is switched to the unfixed state vice versa, namely, in an engaging or disengaging mode, vibration mainly longitudinally caused on the rotation prohibiting lever 121 can be absorbed. By placing the flexible portion 141 between the supporting shaft 123 and the bidirectional rotation prohibiting pick 126 in this way, an amount of vibration conveyed to the supporting shaft 123 can be reduced.

Now, a manner of prohibiting rotation of the ratchet 112 by the rotation prohibiting lever 121 is described more in detail with reference to FIGS. 6A and 6B. As shown there, the bidirectional rotation prohibiting pick 126 of the rotation prohibiting lever 121 either advances or retreats to and from the ratchet 112 by its own swinging (rocking) around the support shaft 132.

Further, since the ratchet 112 rotates around the output shaft 109, the ratchet teeth 113 moves in a circumferential direction of the ratchet 112. In addition, as shown in the FIGS. 7A and 7B, a moving direction (i.e., directions shown by arrows G and H) of the ratchet teeth 113 at a position in which the bidirectional rotation prohibiting pick 126 of the rotation prohibiting lever 121 hooks up at (engaging) the ratchet tooth 113 of the ratchet 112 is parallel to a longitudinal direction of the lever output section 122 of the rotation prohibiting lever 121. Specifically, since the ratchet tooth 113 tends to continuously move around the output shaft 109 by its inertia in a circumferential direction of the ratchet 112 at an engagement moment, the rotation prohibiting lever 121 receives a stress from the ratchet tooth 113 along the longitudinal direction thereof. Here, the flexible portion 141 absorbs vibration energy propagated from the ratchet tooth 113 of the ratchet 112 mainly by stretching (i.e., elastically deforming) in the longitudinal direction of the output lever 122. Specifically, the flexible portion 141 deforms in a prescribed range as far as the hooking up condition can remain when the bidirectional rotation prohibiting pick 126 hooks up at the ratchet tooth 113. Specifically, the flexible portion 141 serves as not only a deformation amount restricting section that elastically restricts a deformation amount of the output lever 122 to prevent cancellation of the hooking up condition of the bidirectional rotation prohibiting pick 126 to the ratchet tooth 113 due to the stress applied from the ratchet tooth 113, but also as a deformation direction restriction section that elastically restricts a deformation direction of the lever output section 122.

FIG. 10 illustrates one example of the rotation prohibiting lever 121. The rotation prohibiting lever 121 is entirely made of resin and is integrally molded. A pair of projections 123a is formed protruding in an axial direction at both ends of the support shaft 123 as a motion central axis of the rotation prohibiting lever 121. Each projection 123a is inserted into a hole formed on the plastic bearing 138 (see FIG. 4), so that the rotation prohibiting lever 121 can be freely rotatably supported. As shown FIG. 10, the flexible portion 141 can be formed from an S-letter shaped wavy portion 142. Here, the number of convex-concavities of the wavy portion 142 (i.e., the curve number) is not particularly limited, and the wavy portion 142 may be structured from a single curvature or three or more bends in a snaky state. Further, the wavy portion 142 can consist of a single bent or is a zigzag shape by combining multiple bends. Further, as shown in FIG. 11A, one or more portions of the lever output section 122 are cutout in an axial direction of the support bearing 123 to form singular or multiple cutouts 151 in its longitudinal direction to provide a flexible section 141. Otherwise, as shown in FIG. 11B, a narrow width section 152 and a wide width section 153 are arranged in the longitudinal direction to serve as the flexible portion 141. The flexible portion 141 is elastically deformable both in its long and short length directions in the drawing in accordance with (a direction of) force applied from the ratchet 112 to the bidirectional rotation prohibiting pick 126. Accordingly, the wavy portion 142 expands and contracts to absorb vibrational energy generated and conveyed from the bidirectional rotation prohibiting pick 126 to the supporting shaft 123 both when the bidirectional rotation prohibiting pick 126 hooks up at or separates from the ratchet tooth 113 in fixed and unfixed states, respectively. Consequently, the vibration transmitted to the supporting shaft 123 of the rotation prohibiting lever 121 can be minimized. Further, by thus arranging the flexible portion 141 on the rotation prohibiting lever 121, vibration reduction can be obtained by some degree as described. However, if a supporting shaft 123 serving as the operation central axis is made of resin, the vibration can be more effectively reduced.

Further, the flexible portion 141 may be configurable from multiple members as shown in FIG. 12. Specifically, as there shown, the flexible portion 141 can be formed from a base 143 located on the side of the supporting shaft 123 in the lever output section 122, a bidirectional rotation prohibiting pick 126 at its tip, and a movable section 144 capable of advancing and retreating to and from the base 143. The base 143 includes a projection 145 protruding toward the movable section 144. The projection 145 penetrates and holds a compression coil spring inserted thereto as an elastic member 146 to absorb vibration transmitted to the supporting shaft 123 from the bidirectional rotation prohibiting pick 126. A recess 147 is formed in the movable section 144 to receive the projection 145. Further, one end of the compression coil spring (i.e., the elastic member 146) in its axial direction is fixed to a prescribed section of the base 143, while the other end is fixed to a prescribed section of the movable section 144.

Further, a guide piece 148 protrudes sideward from the base 143 of the movable section 144 and extends toward the supporting shaft 123. An oblong hole 149 is formed penetrating the guide piece 149. A boss 150 protrudes from the side of the base 143 and is inserted into the oblong hole 149, so that the oblong hole 149 guides the movable section 144 to freely advance and retreat in its longitudinal direction. Specifically, the movable section 144 advances and retreats in a direction which the ratchet tooth 113 attempts to move when the bidirectional rotation prohibiting pick 126 hooks up at the ratchet tooth 113. Further, the elastic member 146 elastically restricts advancing and retreating movement of the movable section 144 within prescribed range to maintain a hooking up condition of the bidirectional rotation prohibiting pick 126 at the ratchet tooth 113. Specifically, the vibrational energy generated when vibration is conveyed from the bidirectional rotation prohibiting pick 126 to the supporting shaft 123 both immediately after the bidirectional rotation prohibiting pick 126 hooks up at or separates from the ratchet tooth 113 in fixed and unfixed states, respectively, is not absorbed by deformation of the rotation prohibiting lever 121, but is absorbed by deformation of the elastic member 146. Consequently, the elastic member 146 can minimize the vibration transmitted to the supporting shaft 123. The compression coil spring as an elastic member 146 extremely exerts a vibration reduction function in the longitudinal direction in the drawing based on its nature. Beside, the compression coil spring generally can even deform in the other direction than the longitudinal direction when an external force (e.g., transverse force (force in a short length direction)) is applied thereto in the other direction. The flexible portion 141 of this embodiment also can deform in the other direction beside the longitudinal direction. Specifically, thus, the elastic member 146 receiving the external force deforms and demonstrates effect of the vibration reduction in the other direction than the longitudinal direction.

Further, the elastic member 146 can intervene between the base 143 and the movable section 144 to prevent vibration from traveling to the supporting shaft 123 by its elastic deformation. Accordingly, as the elastic member 146, beside the above-described compression coil spring, a rubber member can be used and is placed between the base 143 and the movable section 144. For example, a ring-shaped rubber member can be inserted into the projection 145. Otherwise, the rubber member can be filled between the movable section 144 and the base 143. Thus, by reducing the vibration transmitted to the supporting shaft 123 of the rotation prohibiting lever 121, force generated immediately after the bidirectional rotation prohibiting pick 126 and the ratchet tooth 113 enter either the fixed or unfixed state can be weakened reducing noise. Further, abrasion of the bidirectional rotation prohibiting pick 126 and the forward and reverse rotation prohibiting sides 128 and 129 generally caused after long-term usage can be reduced upgrading durability of those. As a result, a clutch mechanism using a planetary gear mechanism capable of accommodating bi-directional rotation of the driving unit installed on the downstream side can be provided reducing noise and efficiently saving energy. Further, by employing a clutch mechanism of this embodiment, an image forming apparatus can save energy by suppressing driving power consumed by a driving source.

Heretofore, one example that employs the planetary gear clutch mechanism 100 in the developing roller driving gear train 90 that rotates the developing roller 4 and the developer mixing conveying screws 5 and 6 provided in the developing device 3 is described.

However, the present invention is not necessarily limited to such an arrangement, and can be widely applied to the other driving force transmitting system that need to accommodate bi-directional rotation of a driving unit located on a downstream side thereof.

Numerous additional modifications and variations of the present invention are possible in light of the above teachings. It is therefore to be understood that within the scope of the appended claims, the present invention may be practiced otherwise than as specifically described herein.

What is claimed is:
1. A clutch mechanism, comprising:
a planetary gear unit including:
a sun gear;
a planetary gear meshing with the sun gear;
an inner teeth gear meshing with the planetary gear, the sun gear, the planetary gear, and the inner teeth gear selectively rotating and stopping to provide driving force inputting, outputting, and stopping functions as input transmission, output transmission, and transmission stopping members, torque entering the input transmission member being outputted downstream of the planetary gear unit by the output transmission member when the transmission stopping member is fixed, the torque not being outputted downstream when the transmission stopping member is unfixed entering a rotatable state, and
a holder to hold the planetary gear,
a rotation prohibiting target integral with the transmission stopping member, the rotation prohibiting target having an engaging target;
a rotation prohibiting member including:
a supporting shaft located at a prescribed portion thereof;
a swingable portion at its one end; and
an engaging portion at its other end to engage the engaging target to enable the transmission stopping member to exert the stopping function, the engaging portion disengaging the engaging target to bring the transmission stopping member into an unfixed state;
a switching unit having an actuator to switch the rotation prohibiting member between engaging and disengaging states; and
a damper unit to absorb vibration caused in the rotation prohibiting member during a switching operation, and the damper unit of the rotation prohibiting member comprises a lever including a wavy portion or one or more cutouts or a spring.

2. The clutch mechanism as claimed in claim 1, wherein the damper unit comprises:
a movable section to advance and retreat at least in a moving direction of the engaging target when the engaging portion engages the engaging target;
a base to support and allow the movable section to advance and retreat; and
an elastic member to elastically restrict advancing and retreating of the movable section.

3. The clutch mechanism as claimed in claim 1, wherein the damper unit of the rotation prohibiting member comprises an elastically deformable portion.

4. The clutch mechanism as claimed in claim 1, wherein the supporting shaft is made of resin.

5. The clutch mechanism as claimed in claim 1, wherein the engaging portion comprises:
a forward rotation prohibiting side to engage the rotation prohibiting target when a forward rotation of the rotation prohibiting target is to be prohibited, and
a backward rotation prohibiting side to engage the rotation prohibiting target when a backward rotation of the rotation prohibiting target is to be prohibited.

6. The clutch mechanism as claimed in claim 1, wherein the switching unit comprises:
an elastic biasing member to always bias the engaging portion toward the rotation prohibiting target and separate the engaging section from the rotation prohibiting target in a prescribed first direction; and
a solenoid to move the engaging portion in a second direction opposite the first direction.

7. The clutch mechanism as claimed in claim 1, wherein the damper unit is located between the supporting shaft and the engaging portion of the rotation prohibiting member.

8. An image forming apparatus comprising:
an image bearer to bear an image;
a developer bearer to bear developer;
a driving source to drive the image bearer and the developer bearer; and
a driving force transmission mechanism to propagate driving force from the driving source to the image bearer and the developer bearer, the driving force transmission mechanism including the clutch mechanism as claimed in claim 1.

9. The image forming apparatus as claimed in claim 8, wherein the damper unit is located between the supporting shaft and the engaging portion of the rotation prohibiting member.

10. The image forming apparatus as claimed in claim 8, wherein the damper unit comprises:
a movable section to advance and retreat at least in a moving direction of the engaging target when the engaging section engages the engaging target;
a base to support and allow the movable section to advance and retreat; and
an elastic member to elastically restrict advancing and retreating of the movable section.

11. The image forming apparatus as claimed in claim 8, wherein the damper unit of the rotation prohibiting member comprises an elastically deformable portion.

12. The image forming apparatus as claimed in claim 8, wherein the supporting shaft to support the rotation prohibiting member is made of resin.

13. The image forming apparatus as claimed in claim 8, wherein the engaging portion comprises:
a forward rotation prohibiting side to engage the rotation prohibiting target when a forward rotation of the rotation prohibiting target is to be prohibited, and
a backward rotation prohibiting side to engage the rotation prohibiting target when a backward rotation of the rotation prohibiting target is to be prohibited.

14. The image forming apparatus as claimed in claim 8, wherein the switching unit comprises:
an elastic biasing member to always bias the engaging portion toward the rotation prohibiting target and separate the engaging section from the rotation prohibiting target in a prescribed first direction; and
a solenoid to move the engaging section in a second direction opposite the first direction.

15. A method of conveying torque downstream using a planetary gear unit having a sun gear, a planetary gear meshing with the sun gear, an inner teeth gear meshing with the planetary gear, and a holder holding the planetary gear, the method comprising:
selectively rotating and stopping the sun gear, the planetary gear, and the inner teeth gear to provide driving force inputting, outputting, and stopping functions as input transmission, output transmission, and transmission stopping members;
controlling a rotation prohibiting member swingable around a supporting shaft having a swingable portion at its one end and an engaging portion at its other end to either engage a rotation prohibiting target having an engaging target integral with the transmission stopping member to enable the transmission stopping member to exert the stopping function to fix the transmission stopping member and output the torque entering the input transmission member downstream of the planetary gear unit via the output transmission member or disengage the engaging target to bring the transmission stopping member into an unfixed state to unfix the transmission stopping member and enter a rotatable state; and
absorbing vibration caused in the rotation prohibiting member with a damper unit during a switching operation, wherein the damper unit of the rotation prohibiting member comprises a lever including a wavy portion or one or more cutouts or a spring.

16. The method as claimed in claim 15, wherein the damper unit is located between the supporting shaft and the engaging portion of the rotation prohibiting member.

17. The method as claimed in claim 15, wherein the damper unit comprises:
a movable section to advance and retreat at least in a moving direction of the engaging target when the engaging portion engages the engaging target;
a base to support and allow the movable section to advance and retreat; and
an elastic member to elastically restrict advancing and retreating of the movable section.

18. The method as claimed in claim 15, wherein the damper unit of the rotation prohibiting member comprises an elastically deformable portion.

19. The method as claimed in claim 15, wherein the supporting shaft is made of resin.

20. The method as claimed in claim 15, wherein the engaging portion comprises:
   a forward rotation prohibiting side to engage the rotation prohibiting target when a forward rotation of the rotation prohibiting target is to be prohibited, and
   a backward rotation prohibiting side to engage the rotation prohibiting target when a backward rotation of the rotation prohibiting target is to be prohibited.

\* \* \* \* \*